United States Patent
Pradel et al.

(10) Patent No.: US 7,067,196 B2
(45) Date of Patent: Jun. 27, 2006

(54) GRAFTED SYNDIOTACTIC POLYPROPYLENE AND COEXTRUDING BINDERS BASED ON SYNDIOTACTIC POLYPROPYLENE

(75) Inventors: Jean-Laurent Pradel, Bernay (FR); Patrice Robert, Serquigny (FR)

(73) Assignee: Arkema, Puteaux (FR)

( * ) Notice: Subject to any disclaimer, the term of this patent is extended or adjusted under 35 U.S.C. 154(b) by 160 days.

(21) Appl. No.: 10/311,291

(22) PCT Filed: Jun. 14, 2001

(86) PCT No.: PCT/FR01/01859

§ 371 (c)(1),
(2), (4) Date: Jul. 21, 2003

(87) PCT Pub. No.: WO01/98356

PCT Pub. Date: Dec. 27, 2001

(65) Prior Publication Data

US 2004/0014897 A1 Jan. 22, 2004

(30) Foreign Application Priority Data

Jun. 20, 2000 (FR) .......................... 00 07845

(51) Int. Cl.
*B32B 27/32* (2006.01)

(52) U.S. Cl. ............... 428/520; 428/516; 428/522; 525/69; 525/74; 525/240

(58) Field of Classification Search ............... 525/69, 525/74, 240; 428/520, 516, 522
See application file for complete search history.

(56) References Cited

U.S. PATENT DOCUMENTS 5,373,059 A * 12/1994 Asanuma et al. ........... 525/288
5,374,685 A * 12/1994 Asanuma et al. ........... 525/288
6,703,134 B1 * 3/2004 Parr et al. ................... 428/461

FOREIGN PATENT DOCUMENTS

EP 457 291 A2 * 11/1991
JP 409078046 * 3/1997

* cited by examiner

*Primary Examiner*—D. Lawrence Tarazano
(74) *Attorney, Agent, or Firm*—Millen, White, Zelano & Branigan, P.C.

(57) ABSTRACT

A coextrusion binder and a multilayer structure containing the binding wherein the binder contains a composition comprising (I) syndiotactic polypropylene and (II) at least one polymer being:

(A), a polyethylene or a copolymer of ethylene, (B), any of (B1) isotactic polypropylene homopolymer of copolymer, (B2) poly(1-butene) homo- or copolymer or (B3) polystyrene homo- or copolymer, and a blend of (A) and (B), said composition being grafted with a functional monomer such that each of I and II is at least partially grafted with said functional monomer.

17 Claims, No Drawings

GRAFTED SYNDIOTACTIC POLYPROPYLENE AND COEXTRUDING BINDERS BASED ON SYNDIOTACTIC POLYPROPYLENE

BACKGROUND OF THE INVENTION

The present invention relates to syndiotactic polypropylene where on has been grafted a functional monomer. This product is of use as a compatibilizing agent, for example in blends of polyamide and of polypropylene or in blends of polypropylene and of glass fibres. The syndiotactic polypropylene is also of use as a coextrusion binder.

The coextrusion binder is composed (i) either of grafted syndiotactic polypropylene then optionally diluted in at least one polyolefin (C1) or in at least one polymer with an elastomeric nature (D) or in a blend of (C1) and (D), (ii) or of grafted isotactic polypropylene diluted in syndiotactic polypropylene and optionally in at least one polymer with an elastomeric nature (D).

These coextrusion binders are of use, for example, in the manufacture of multilayer materials for packaging. Mention may be made of materials comprising a film of polyamide (PA) and a film of polypropylene (PP), it being possible for the polypropylene film to be laminated onto the polyamide film or coextruded with the polyamide. The coextrusion binder is positioned between the polypropylene and the polyamide for good adhesion of the PA and of the PP. These multilayer materials can be three-layer structures PP/binder/EVOH in which EVOH denotes a copolymer of ethylene and of vinyl alcohol or a partially or completely ethylene/saponified vinyl acetate (EVA) copolymer or five-layer structures PP/binder/EVOH/binder/PP.

PRIOR ART AND TECHNICAL PROBLEM

Polypropylene is described in Kirk-Othmer, Encyclopaedia of Chemical Technology, 4th edition, Vol. 17, pages 784–819, John Wiley & Sons, 1996. Virtually all polypropylene sold is composed essentially of isotactic polypropylene possibly containing a small amount of atactic polypropylene.

Numerous prior arts exist disclosing grafted polypropylene but it is always isotactic polypropylene.

Patent U.S. Pat. No. 5,235,149 discloses packagings closed by caps composed of an aluminium sheet, of a binder layer and of a polypropylene layer. The binder layer of the cap is composed of various polymers grafted with acrylic acid or maleic anhydride; the polymers can be chosen from polyethylene, polypropylene, copolymers of ethylene and of vinyl acetate and copolymers of ethylene and of methyl acrylate.

Patent DE 19 535 915 A discloses a grafted polypropylene block copolymer for adhesively bonding polypropylene films to metal sheets.

Patent EP 689 505 discloses structures similar to those disclosed in the above patent but which are used to prepare food packagings.

Patent EP 658 139 discloses structures similar to those disclosed in the preceding patent but the binder is a grafted random polypropylene copolymer comprising from 1 to 10% of comonomer, the Mw/Mn ratio is between 2 and 10 and the MFI (Melt Flow Index) is comprised between 1 and 20 g/10 min (230° C., 2.16 kg).

The radical grafting of functional monomers to polyolefins is carried out either in the molten state, or in solution, using radical initiators, such as peroxides, or in the solid state, by irradiation. Under the action of the radicals, side reactions occur at the same time as the grafting reaction. They result in an increase in the molecular mass in the case where the polymer to be grafted is polyethylene or in its decrease in the case where this is polypropylene. If the amount of radicals necessary for the grafting reaction is high, the change in the molecular mass of the polyolefin results in a significant modification in its melt viscosity. These grafting operations are generally carried out in an extruder. The viscosity of the grafted polyethylene is so high that it is no longer possible to extrude it; the viscosity of the grafted polypropylene is so low that it too can no longer be extruded. These phenomena reduce the amount of reactive functional groups which can be incorporated into the polyolefin by radical grafting of functional monomers.

Patent EP 802 207 discloses the grafting of large amounts of functional monomer to blends of polyethylene and of polypropylene. The increase in the molecular mass of the polyethylene is compensated for by the decrease in the molecular mass of the polypropylene present during the radical grafting reaction. Generally, this blend of cografted polyethylene and polypropylene is subsequently diluted in a polyolefin.

It has now been found that a functional monomer can be grafted to syndiotactic polypropylene and that the melt flow index (also denoted by MFI) increases much less than if isotactic polypropylene were grafted. It is thus possible to graft amounts of functional monomer which can reach 4 to 8% by weight of the syndiotactic polypropylene. This solution is simpler than to graft a blend of polypropylene and of polyethylene.

BRIEF DESCRIPTION OF THE INVENTION

The present invention relates to syndiotactic polypropylene to which has been grafted a functional monomer.

The invention also relates to a coextrusion binder composed (i) either of grafted syndiotactic polypropylene then optionally diluted in at least one polyolefin (C1) or in at least one polymer with an elastomeric nature (D) or in a blend of (C1) and (D), (ii) or of grafted isotactic polypropylene diluted in syndiotactic polypropylene and optionally in at least one polymer with an elastomeric nature (D).

The present invention also relates to a multilayer structure composed of a layer comprising the preceding binder and, directly attached to this layer, a layer of nitrogen-comprising or oxygen-comprising polar resin, such as a layer (E) of a polyamide resin, of a saponified copolymer of ethylene and of vinyl acetate, of a polyester resin, of an inorganic oxide deposited on a polymer, such as PE, poly(ethylene terephthalate) or EVOH, or else a metal or metalloplastic layer.

According to another alternative form, the invention also relates to the preceding structure with, directly attached to the latter, on the side of the binder, a polyolefin-based layer (F).

DETAILED DESCRIPTION OF THE INVENTION

Syndiotactic polypropylene is described in Kirk-Othmer, Encyclopedia of Chemical Technology, 4$^{th}$ edition, Vol. 17, pages 784–819, John Wiley & Sons, 1996. Advantageously, its MFI (in g/10 min at 190° C., 2.16 kg) is at most 10 and advantageously between 0.1 and 3.

Mention may also be made of the syndiotactic polypropylene disclosed in patents U.S. Pat. Nos. 5,969,021, 5,710, 222, 5,688,735, 5,476,914, 5,334,677, 5,292,838, 5,278,265, 5,243,002, 5,225,500, 5,223,468, 5,223,467, 5,155,080 and 4,892,851.

It would not be departing from the scope of the invention if the syndiotactic polypropylene were to comprise at least one polymer chosen from (A), denoting a polyethylene or a copolymer of ethylene, and (B), itself chosen from (B1) isotactic polypropylene homopolymer or copolymer, (B2) poly(1-butene) homo- or copolymer and (B3) polystyrene homo- or copolymer. That is to say that a blend comprising either syndiotactic polypropylene and (A), or syndiotactic polypropylene and (B), or syndiotactic polypropylene and (A) and (B), is grafted. Advantageously, the proportion of (A) and/or (B) represents less than 40% by weight of the combination of syndiotactic polypropylene and (A) and/or (B).

(A) is chosen from polyethylene homo- or copolymers.

Mention may be made, as comonomers, of the following:

α-olefins, advantageously those having from 3 to 30 carbon atoms. Examples of α-olefins having 3 to 30 carbon atoms as possible comonomers comprise propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-dococene, 1-tetracocene, 1-hexacocene, 1-octacocene and 1-triacontene. These α-olefins can be used alone or as a mixture of two or of more than two.

esters of unsaturated carboxylic acids, such as, for example, alkyl (meth)acrylates, it being possible for the alkyls to have up to 24 carbon atoms.

Examples of alkyl acrylate or methacrylate are in particular methyl methacrylate, ethyl acrylate, n-butyl acrylate, isobutyl acrylate or 2-ethylhexyl acrylate.

vinyl esters of saturated carboxylic acids, such as, for example, vinyl acetate or propionate.

unsaturated epoxides.

Examples of unsaturated epoxides are in particular:

aliphatic glycidyl esters and ethers, such as allyl glycidyl ether, vinyl glycidyl ether, glycidyl maleate, glycidyl itaconate, glycidyl acrylate or glycidyl methacrylate, and alicyclic glycidyl esters and ethers, such as 2-cyclohexene-1-glycidyl ether, diglycidyl cyclohexene-4,5-carboxylate, glycidyl cyclohexene-4-carboxylate, glycidyl 2-methyl-5-norbornene-2-carboxylate and diglycidyl endo-cis-bicyclo[2.2.1] hept-5-ene-2,3-dicarboxylate.

unsaturated carboxylic acids, their salts and their anhydrides.

Examples of unsaturated dicarboxylic acid anhydrides are in particular maleic anhydride, itaconic anhydride, citraconic anhydride and tetrahydrophthalic anhydride.

dienes, such as, for example, 1,4-hexadiene.

(A) can comprise several comonomers.

Advantageously, the polymer (A), which can be a blend of several polymers, comprises at least 50 mol % and preferably 75 mol % of ethylene. The density of (A) can be between 0.86 and 0.98 g/cm$^3$. The MFI (viscosity index at 190° C., 2.16 kg) is advantageously comprised between 1 and 1000 g/10 min.

Mention may be made, as example of polymers (A), of:

low density polyethylene (LDPE)

high density polyethylene (HDPE)

linear low density polyethylene (LLDPE)

very low density polyethylene (VLDPE)

polyethylene obtained by metallocene catalysis, that is to say the polymers obtained by copolymerization of ethylene and of α-olefin, such as propylene, butene, hexene or octene, in the presence of a single-site catalyst generally composed of a zirconium or titanium atom and of two cyclic alkyl molecules bonded to the metal. More specifically, the metallocene catalysts are usually composed of two cyclopentadiene rings bonded to the metal. These catalysts are frequently used with aluminoxanes as cocatalysts or activators, preferably methylaluminoxane (MAO). Hafnium can also be used as metal to which the cyclopentadiene is attached. Other metallocenes can include transition metals from Groups IVA, VA and VIA. Metals from the lanthamide series can also be used.

EPR (ethylene/propylene rubber) elastomers;

EPDM (ethylene/propylene/diene) elastomers;

blends of polyethylene with an EPR or an EPDM;

ethylene/alkyl (meth)acrylate copolymers which can comprise up to 60% by weight of (meth)acrylate and preferably from 2 to 40%;

ethylene/alkyl (meth)acrylate/maleic anhydride copolymers obtained by copolymerization of the three monomers, the proportions of (meth)acrylate being as the above copolymers, the amount of maleic anhydride being up to 10% and preferably 0.2 to 6% by weight;

ethylene/vinyl acetate/maleic anhydride copolymers obtained by copolymerization of the three monomers, the proportions being the same as in the above copolymer.

As regards (B1), this is an isotactic polypropylene homo- or copolymer. Mention may be made, as comonomers, of:

α-olefins, advantageously those having from 3 to 30 carbon atoms. Examples of such α-olefins are the same as for (A), except that propylene is replaced by ethylene in the list, dienes.

(B1) can also be a copolymer comprising polypropylene blocks.

Mention may be made, as example of polymer (B1), of:

polypropylene, blends of polypropylene and of EPDM or of EPR.

Advantageously, the polymer (B1), which can be a blend of several polymers, comprises at least 50 mol % and preferably 75 mol % of propylene.

B2 is chosen from poly(1-butene) or the copolymers of 1-butene with ethylene or another α-olefin having from 3 to 10 carbons, except the propylene already mentioned in (B1).

(B3) is chosen from polystyrene or styrene copolymers. Mention may be made, among the copolymers, by way of example, of dienes having from 4 to 8 carbon atoms.

As regards the functional monomer, it is unsaturated, mention may be made, by way of example, of alkoxysilanes, carboxylic acids and their derivatives, acid chlorides, isocyanates, oxazolines, epoxides, amines or hydroxides.

Mention may be made, among alkoxysilanes carrying an unsaturation, of:

$CH_2 = CH—Si(OR)_3$ vinyltrialkoxysilanes $CH_2 = CH—CH_2—Si(OR)_3$ allyltrialkoxysilanes $CH_2 = CR_1—CO—O—Y—Si(OR)_3$ (meth) acryloxyalkyltrialkoxysilanes (or (meth)acrylsilanes) in which:

R is an alkyl having from 1 to 5 carbon atoms or an alkoxyl —$R_2OR_3$ in which $R_2$ and $R_3$ are alkyls having at most 5 carbon atoms for the combination of $R_2$ and $R_3$.

R₁ is a hydrogen or a methyl.

Y is an alkylene having from 1 to 5 carbon atoms.

Use is made, for example, of vinylsilanes, such as trimethoxyvinylsilane, triethoxyvinylsilane, tripropoxyvinylsilane, tributoxyvinylsilane, tripentoxyvinylsilane or tris(β-methoxyethoxy)vinylsilane, allylsilanes, such as trimethoxyallylsilane, triethoxyallylsilane, tripropoxyallylsilane, tributoxyallylsilane or tripentoxyallylsilane, or acrylsilanes, such as acryloxymethyltrimethoxysilane, methacryloxymethylmethoxysilane, acryloxyethyltrimethoxysilane, methacryloxymethylmethoxysilane, acryloxyethyltrimethoxysilane, methacryloxyethyltrimethoxysilane, acryloxypropyltrimethoxysilane, methacryloxypropyltrimethoxysilane, acryloxybutyltrimethoxysilane, methacryloxybutylmethoxysilane, acryloxyethyltriethoxysilane, methacryloxyethyltriethoxysilane, methacryloxyethyltripropoxysilane, acryloxypropyltributoxysilane or methacryloxypropyltripentoxysilane.

Use may also be made of mixtures of these products.

Use is preferably made of:

CH$_2$=CH—Si—(OCH$_3$)$_3$ vinyltrimethoxysilane (VTMO)

CH$_2$=CH—Si—(OCH$_2$CH$_3$)$_3$ vinyltriethoxysilane (VTEO)

CH$_2$=CH—Si—(OCH$_2$OCH$_2$CH$_3$)$_3$ vinyltrimethoxyethoxysilane (VTMOEO)

and (3-(methacryloxy)propyl)trimethoxysilane CH$_2$=C(CH$_3$)—CO—O—(CH$_2$)$_3$—Si (OCH$_3$)$_3$ Examples of unsaturated carboxylic acids are those having 2 to 20 carbon atoms, such as acrylic, methacrylic, maleic, fumaric and itaconic acids. The functional derivatives of these acids comprise, for example, the anhydrides, the ester derivatives, the amide derivatives, the imide derivatives and the metal salts (such as the alkali metal salts) of the unsaturated carboxylic acids.

Unsaturated dicarboxylic acids having 4 to 10 carbon atoms and their functional derivatives, particularly their anhydrides, are particularly preferred grafting monomers.

These grafting monomers comprise, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1-hept-5-ene-2,3-dicarboxylic and x-methylbicyclo-[2.2.1-hept-5-ene-2,3-dicarboxylic acids and maleic, itaconic, citraconic, allylsuccinic, cyclohex-4-ene-1,2-dicarboxylic, 4-methylenecyclohex-4-ene-1,2-dicarboxylic, bicyclo[2.2.1]hept-5-ene-2,3-dicarboxylic and x-methylbicyclo[2.2.1]hept-5-ene-2,2-dicarboxylic anhydrides.

Examples of other grafting monomer comprise C$_1$–C$_8$ alkyl esters or glycidyl ester derivatives of unsaturated carboxylic acids, such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate and diethyl itaconate; the amide derivatives of unsaturated carboxylic acids, such as acrylamide, methacrylamide, maleic monoamide, maleic diamide, maleic N-monoethylamide, maleic N,N-diethylamide, maleic N-monobutylamide, maleic N,N-dibutylamide, fumaric monoamide, fumaric diamide, fumaric N-monoethylamide, fumaric N,N-diethylamide, fumaric N-monobutylamide and fumaric N,N-dibutylamide; the imide derivatives of unsaturated carboxylic acids, such as maleimide, N-butylmaleimide and N-phenyl-maleimide; and metal salts of unsaturated carboxylic acids, such as sodium acrylate, sodium methacrylate, potassium acrylate and potassium methacrylate.

Various known processes can be used to graft a grafting monomer onto the syndiotactic polypropylene optionally comprising (A) and/or (B).

For example, this can be carried out by heating it at high temperature, approximately 150° C. to approximately 300° C., in the presence or absence of a solvent, with or without a radical initiator. Appropriate solvents which can be used in this reaction are benzene, toluene, xylene, chlorobenzene, cumene and the like. Appropriate radical initiators which can be used comprise t-butyl hydroperoxide, cumene hydroperoxide, diisopropylbenzene hydroperoxide, di(t-butyl) peroxide, t-butyl cumyl peroxide, dicumyl peroxide, 1,3-bis(t-butylperoxyisopropyl)benzene, acetyl peroxide, benzoyl peroxide, isobutyryl peroxide, bis(3,5,5-trimethylhexanoyl) peroxide and methyl ethyl ketone peroxide.

The syndiotactic polypropylene and optionally (A) and/or (B) can be dry or melt preblended and can then be grafted in the molten state or in solution in a solvent. They can also be added separately to a device for bringing into contact and blending (for example, an extruder), together with the grafting monomer and the radical initiator. Use may be made of the usual mixing and blending devices of the thermoplastics industry.

The amount of grafting monomer can be appropriately chosen but it is preferably from 0.01 to 10%, better still from 0.1 to 5%, with respect to the weight of the grafted polypropylene, optionally comprising (A) and/or (B). The amount of grafted monomer is determined by quantitatively determining the succinic functional groups by FTIR spectroscopy.

The invention also relates to a coextrusion binder composed:

either (1), according to a first form, of grafted syndiotactic polypropylene then optionally diluted in at least one polyolefin (C1) or in at least one polymer with an elastomeric nature (D) or in a blend of (C1) and (D), or (ii), according to a second form, of grafted isotactic polypropylene diluted in syndiotactic polypropylene and optionally in at least one polymer with an elastomeric nature (D).

As regards the first form, the binder is therefore composed of the grafted syndiotactic polypropylene which was described above and which is optionally diluted in at least one polyolefin (C1) or in at least one polymer with an elastomeric nature (D) or in a blend of (C1) and (D).

The polyolefin (C1) can be chosen from the polymers (A), (B) and the syndiotactic polypropylene. (D) is a polymer with an elastomeric nature, that is to say that it can be an (i) elastomer within the meaning of ASTM D412, that is to say a material which can be drawn at ambient temperature to two times its width, can be held thus for 5 minutes and then, when it is released, it returns to its starting length, to within less than about 10%, or (ii) a polymer which does not have exactly these above characteristics but which can be drawn and can return substantially to its starting length.

The MFI of (D) is advantageously between 0.1 and 50.

Mention may be made, as example of polymers (D), of:

EPR (ethylene/propylene rubber) polymers and EPDM (ethylene/propylene/diene) polymers;

polyethylenes obtained by metallocene catalysis and with a density of less than 0.910 g/cm$^3$;

polyethylenes of VLDPE type (very low density);

styrene elastomers, such as SBR (styrene/butadiene rubber) elastomers, styrene/(styrene/butadiene/styrene (SBS) block copolymers, styrene/ethylene/butene/styrene (SEBS) block copolymers and styrene/isoprene/styrene (SIS) block copolymers;

copolymers of ethylene and of at least one ester of unsaturated carboxylic acid (already defined in (A));

copolymers of ethylene and of at least one vinyl ester of saturated carboxylic acid (already defined in (A)).

The amount of (C1) or (D) or (C1)+(D) is advantageously from 20 to 1 000 and preferably 60 to 500 parts (by weight) per 10 parts of grafted syndiotactic polypropylene. Advantageously, (C1) and (D) are used. The preferred proportions are such that (D)/(C1) is between 0 and 1 and more particularly between 0 and 0.5.

As regards the second form, the grafted isotactic polypropylene is manufactured as mentioned above by grafting a blend comprising at least (B1) and optionally at least one polymer chosen from (A), (B2) and (B3). Advantageously, the proportion of (B1) is at least 50 and preferably 70% by weight of the blend to be grafted. This grafted isotactic propylene is then diluted in syndiotactic propylene and optionally in at least one polymer with an elastomeric nature (D). The polymer (D) has been defined above.

The amount of syndiotactic polypropylene and optionally of (D) can be from 20 to 1 000 and preferably 60 to 500 parts (by weight) per 10 parts of grafted isotactic polypropylene. Use is advantageously made of syndiotactic polypropylene and (D). The preferred proportions are such that the ratio of the amount of (D) to the syndiotactic polypropylene is between 0 and 1 and more particularly between 0 and 0.5.

The binder of the invention can be manufactured by the usual means for thermoplastics by melt blending the various constituents in Buss twin-screw extruders, mixers or roll mills.

The binder of the invention can also comprise various additives, such as antioxidants, ultraviolet absorbers, antistatic agents, pigments, dyes, nucleating agents, fillers, slip agents, lubricants, flame retardants and antiblocking agents.

As regards the multilayer structure of the present invention, it is composed of the layer comprising the above binder and of a layer of oxygen-comprising or nitrogen-comprising polar resin or of an inorganic oxide deposited on a polymer, such as PE, PET or EVOH or a metal layer.

Examples of polar resins which are preferred in the layer other than the binder are polyamide resins, a saponified copolymer of ethylene and of vinyl acetate, and polyesters.

More specifically, they comprise synthetic long-chain polyamides having structural units of the amide group in the main chain, such as PA-6, PA-6,6, PA-6,10, PA-11 and PA-12; a saponified copolymer of ethylene and of vinyl acetate having a degree of saponification of approximately 90 mol % to 100 mol %, obtained by saponifying an ethylene/vinyl acetate copolymer having an ethylene content from approximately 15 mol % to approximately 60 mol %; polyesters, such as poly(ethylene terephthalate), poly(butylene terephthalate) or poly(ethylene naphthenate); and blends of these resins.

The layer of inorganic oxide can, for example, be silica, it is deposited on a layer of PE, PET or EVOH. The structure of the invention therefore comprises, respectively: a binder layer, an $SiO_2$ (or $SiO_x$) layer and either PE or PET or EVOH.

The metal layer can, for example, be a sheet, a film or a sheet of a metal, such as aluminium, iron, copper, tin and nickel, or an alloy containing at least one of these metals as main constituent. The thickness of the film or of the sheet can be suitably chosen and it is, for example, from approximately 0.01 to approximately 0.2 mm. It is common practice to degrease the surface of the metal layer before laminating the binder of the invention thereon. This layer can also be a metalloplastic layer, such as, for example, a sheet of aluminized PET.

It would not be departing from the scope of the invention if the preceding structure were combined with other layers.

The invention also relates to the preceding structure combined on the side of the binder with a polyolefin-based layer (F). The polyolefin (F) can be chosen from the polymers (A) and (B) above.

These structures are of use in preparing packagings, for example rigid hollow bodies, such as bottles or jars, flexible bags or multilayer films.

The binders of the invention are of use for the following structures.

PE/binder/EVOH/binder/PE (PE denotes polyethylene)
PE/binder/EVOH
PE/binder/PA
PP/binder/PA
PP/binder/EVOH/binder/PP (PP denotes polypropylene).

These structures and these packagings can be manufactured by coextrusion, lamination, extrusion-blow moulding and coating.

EXAMPLES

The following products were used:

| | |
|---|---|
| sPP: | Syndiotactic polypropylene. |
| PP 3060 MN5: | Isotactic copolymer comprising propylene/ethylene blocks with a density = 0.902 g/cm$^3$ and with an MFI = 6 (230° C./2.16 kg). |
| PP 3050 MN1: | Isotactic polypropylene homopolymer with a density of 0.905 g/cm$^3$ and an MFI of 5 (230° C./2.16 kg). |
| PP 3020 GN3: | Random polypropylene copolymer with a density of 0.900 g/cm$^3$ and with an MVI (melt volume index) of 2 cm$^3$/10 min (230° C./2.16 kg). |
| MAH: | Maleic anhydride. |
| PPC: | Polypropylene grafted with maleic anhydride comprising 0.1% of MAH, with an MFI of 2 g/10 min (190° C./2.16 kg). |
| PPAM2: | Polypropylene grafted with maleic anhydride comprising 2.5% of MAH, with an MFI of 40 g/10 min (190° C./325 g). |

The products are grafted with maleic anhydride. They are manufactured in a corotating twin-screw extruder of Leistritz type.

The extruder comprises 8 regions numbered Z1 to Z8, Z8 is situated at the end of the extruder where the grafted products exit. The processing is carried out at the usual temperatures.

The maleic anhydride, on polyethylene powder, and the polypropylene to be grafted are introduced into the region Z1 via two separate weight metering devices.

The radical initiator, pure or diluted in an appropriate solvent, is introduced via a metering pump into the region Z2. The temperatures in the regions Z3, Z4 and Z5 are at least sufficient for 99.9% of the radical initiator to react before the region Z6. The initiator used is 2,5-dimethyl-2,5-(di-tert-butyl)hexane (Luperox 10) (DHBP). The residues from the radical initiator, the solvent and the unreacted maleic anhydride are degassed under vacuum in the region Z6.

The throughput for extrusion at the outlet of the region Z8 varies, according to the screw rate imposed, between 12 and 15 kg/h. The lace is granulated after cooling.

The results of the grafting are collated in Table 1. The % values indicated for MAH and the initiator are with respect to the polypropylene.

It is found that, for the isotactic polypropylene, the MFI changes from 0.2 to 5.9 or 10.6 according to the proportion of DHBP added, i.e. an increase by a factor of 30 or 50. By comparison, for the same proportions of DHBP added, the MFI of the syndiotactic polypropylene changes only from 0.7 to 6.6 or 14.3, i.e. an increase by a factor of 10 or 20.

Cast technology was then used to produce a structure comprising 5 layers:

PP/binder/EVOH/binder/PP, in which PP denotes the (isotactic) polypropylene, with respective thicknesses in μm: 20/10/10/10/50. The results are listed in Table 2 below. The peel strength between the PP and the binder on the thin side (PP 20 μm/binder 10 μm) was measured. The strength is expressed in N/15 mm at a drawing rate of 200 mm/min at t0, that is to say immediately after the structure has been prepared.

TABLE 1

| Poly-propylene | MAH introduced (%) | DHBP introduced (%) | Powder comprising 7.5% of DHBP introduced (%) | Powder formed from PE support of the MAH introduced (%) | Grafted MAH (%) | MFI 190° C. 325 g | MFI 190° C. 2.16 kg | MFI 190° C. 5 kg |
|---|---|---|---|---|---|---|---|---|
| PP3060 MN 5 | 1.5 | 0.1500 | 2.00 | 4 | 0.80 | 10.8 | — | — |
| sPP | — | — | — | — | — | 0.0 | 0.7 | 2.3 |
| sPP extr. # | — | — | — | — | — | 0.0 | 0.9 | 2.7 |
| sPP | 1.5 | 0.1500 | 2.00 | 4 | 0.54 | 1.8 | 14.3 | 42.5 |
| sPP | 1.5 | 0.1125 | 1.50 | 4 | 0.41 | 1.1 | 9.8 | 30.2 |
| sPP | 1.5 | 0.0750 | 1.00 | 4 | 0.31 | 0.8 | 6.6 | 20.0 |
| PP 3050 MN 1 | — | — | — | — | — | 0.2 | not measurable | — |
| PP 3050 MN 1 | 1.5 | 0.1500 | 2.00 | 4 | 0.54 | 10.6 | not measurable | — |
| PP 3050 MN 1 | 1.5 | 0.0750 | 1.00 | 4 | 0.34 | 5.9 | not measurable | — | sPP having already been extruded

TABLE 2

| Binder % by weight | Peel strength at t0 N/15 mm | s standard deviation |
|---|---|---|
| PPC | 5.4 | 0.1 |
| 96% sPP 4% PPAM2 | 5.2 | 0.7 |
| 94% sPP 6% PPAM2 | 6.1 | 0.4 |
| 96% PP 3020GN3 4% PPAM2 | 5.8 | 0.6 |
| 94% PP 3020GN3 6% PPAM2 | 5.6 | 0.3 |

What is claimed is:

1. A composition comprising (I) syndiotactic polypropylene and (II) at least one polymer being:

(A), a polyethylene or a copolymer of ethylene, (B), any of (B1) isotactic polypropylene homopolymer or copolymer, (B2) poly(1-butene) homo- or copolymer or (B3) polystyrene homo- or copolymer, or a blend of (A) and (B), said composition being grafted with a functional monomer such that each of (I) and (II) is at least partially grafted with said functional monomer.

2. A composition according to claim 1, wherein the functional monomer is maleic anhydride.

3. A coextrusion binder comprising the composition according to claim 1, diluted in at least one polyolefin (C1) or in at least one elastomeric polymer (D) or in a blend of (C1) and (D).

4. A coextrusion binder according to claim 3, in which the amount of polyolefin (C1) or of elastomeric polymer (D) or of the blend of (C1) and (D) is from 20 to 1000 and (by weight) per 10 parts of grafted syndiotactic polypropylene.

5. A coextrusion binder according to claim 3, in which the amounts by weight of polyolefn (C1) and of elastomeric polymer (D) are such that the weight ratio of (D)/(C1) is between 0 and 1.

6. A multilayer structure comprising:

a layer comprising a coextrusion binder according to claim 3;

and, directly attached to this layer, a layer (E) of a polyamide resin of a saponified copolymer of ethylene and of vinyl acetate, of a polyester resin, or of an inorganic oxide deposited on a polyethylene, polyethylene terephthalate, EVOH, or on a metal or metallo-plastic layer.

7. A structure according to claim 6, comprising a polyolefin-based layer (F) directly attached to the binder layer.

8. A composition according to claim 3, wherein the functional monomer is maleic anhydride.

9. A coextrusion binder according to claim 4, in which the amounts by weight of polyolefin (C1) and of polymer with an elastomeric nature (D) are such that the weight ratio of (D)/(C1) is between 0 and 1.

10. A composition according to claim 4, wherein the functional monomer is maleic anhydride.

11. A composition according to claim 5, wherein the functional monomer is maleic anhydride.

12. A composition according to claim 9, wherein the functional monomer is maleic anhydride.

13. A composition according to claim 10, wherein the functional monomer is maleic anhydride.

14. A coextrusion binder according to claim 10, wherein the blend contains from 60 to 500 parts by weight per 10 parts by weight of grafted isotactic polypropylene.

15. A coextrusion binder according to claim 11, wherein the ratio is between 0 and 0.5% by weight.

16. A multilayer structure comprising:

a layer comprising a coextrusion binder according to claim 4;

and, directly attached to this layer, a layer (E) of a polyamide resin, of a saponified copolymer of ethylene and of vinyl acetate, of a polyester resin, or of an inorganic oxide deposited on a polyethylene, polyethylene terephthalate, EVOH, or on a metal or metalloplastic layer.

17. A multilayer structure comprising:

a layer comprising a coextrusion binder according to claim 5;

and, directly attached to this layer, a layer (E) of a polyamide resin, of a saponified copolymer of ethylene and of vinyl acetate, of a polyester resin, or of an inorganic oxide deposited on a polyethylene, polyethylene terephthalate, EVOH, or on a metal or metalloplastic layer.

* * * * *